United States Patent

[11] 3,597,015

[72] Inventor Stanley L. Stokes
    Florissant, Mo.
[21] Appl. No. 5,468
[22] Filed Jan. 26, 1970
[45] Patented Aug. 3, 1971
[73] Assignee Wagner Electric Corporation
    Newark, N.J.

[54] CONTROL VALVE
    10 Claims, 4 Drawing Figs.
[52] U.S. Cl. .................................................. 303/6 C,
    60/54.5 E, 188/151 A, 188/349, 200/82 D, 303/84 A
[51] Int. Cl. ................................................ B60t 8/26,
    B60t 11/34, B60t 17/22
[50] Field of Search ....................................... 303/6, 6 C,
    84, 84 A; 60/54.5; 188/151 A, 349; 200/82 D

[56] References Cited
    UNITED STATES PATENTS
    3,469,889  9/1969  Bueler ........................... 303/6 C
    3,472,559  10/1969 Bueler ........................... 303/6 C
    3,480,333  11/1969 Stelzer .......................... 303/84 A X
    3,532,390  10/1970 Bueler ........................... 303/6 C Primary Examiner—Milton Buchler
Assistant Examiner—John J. McLaughlin
Attorney—Joseph E. Papin ABSTRACT: A control valve for use in a split braking system with a split master cylinder including a housing having a divider member therein provided with a flow passage for one of the supplied fluid pressures. A proportioning member is movable in the divider member controlling the flow passage to normally establish an applied fluid pressure in a predetermined ratio with the one supplied fluid pressure. The flow passage also includes a branch or bypass portion normally subjected to the applied fluid pressure, and a warning or switch-operating piston has one end slidable in the divider member branch portion normally subjected to the applied fluid pressure and the other end thereof slidable in the housing subjected to the other supplied fluid pressure. A centering piston is subjected to the one supplied fluid pressure and engaged with said housing and switch piston normally maintaining said switch piston in a centered position, and said switch piston is movable upon the failure of the other supplied fluid pressure toward a translated position opening the branch portion to effect open pressure fluid communication therethrough between the one supplied and applied fluid pressures to obviate the proportioning function of the proportioning member.

This invention relates in general to dual or split braking systems and in particular to a combustion driver warning, proportioning and bypass valve for utilization therein.

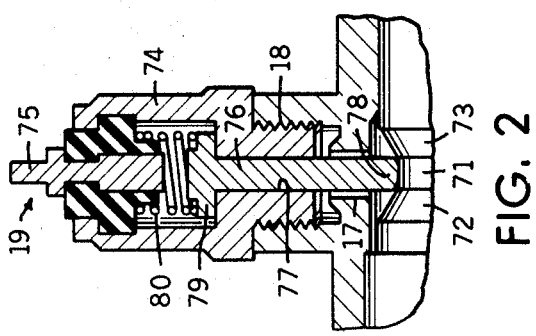
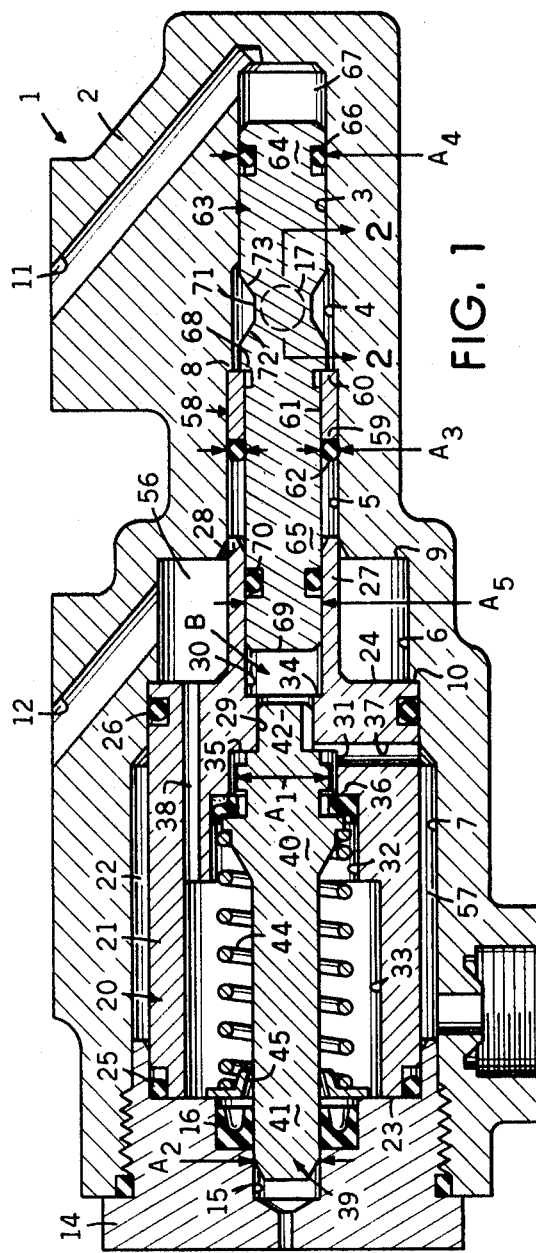
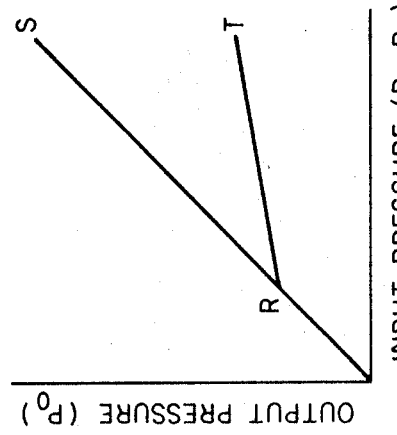
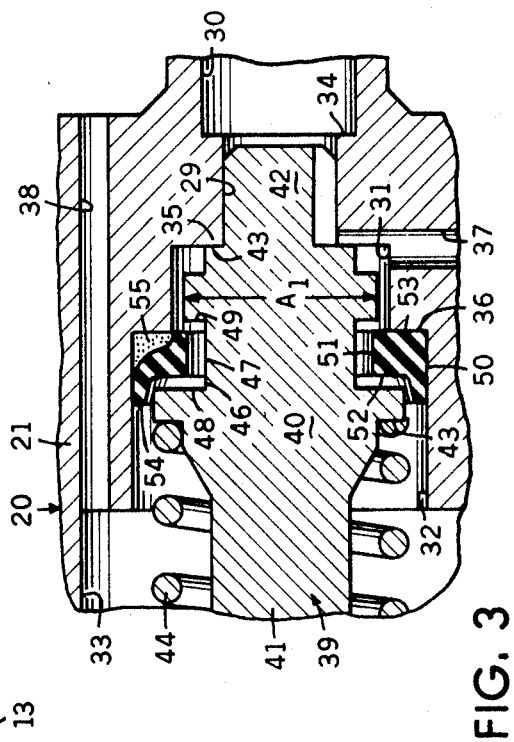
INVENTOR
STANLEY L. STOKES
BY
Joseph E. Papin

CONTROL VALVE

SUMMARY

In past control valves used with a split master cylinder in a split braking system, such as disclosed in my copending application Ser. No. 861,358 filed Sept. 26, 1969, a proportioning member was provided to proportion one of the supplied fluid pressures of the split master cylinder in one of the split systems to effect a proportionally reduced applied fluid pressure in the one split system connected with the vehicle rear brakes; however, in the event of the failure of the other supplied fluid pressure of the split master cylinder in the other of the split systems, it was desirable to bypass the one supplied fluid pressure around the proportioning member to obviate the proportioning function thereof and utilize the maximum available fluid pressure in the one split system for braking under these emergency conditions. This bypassing function was accomplished by an indicating member or switch-operating piston which was provided to compare the magnitudes of the one and other supplied fluid pressures. The switch operating piston was movable toward a translated or bypassing position in response to the one supplied fluid pressure acting thereon upon the failure of the other supplied fluid pressure to bypass the one supplied fluid pressure around the proportioning member in order to obviate the proportioning function thereof.

The present control valve is provided with a divider member having a flow passage therein for the one supplied fluid pressure, and a proportioning member is movable in said flow passage to normally establish the applied fluid pressure in a predetermined ratio with the one supplied fluid pressure. An indicator or switch-operating piston has one end slidable in the divider member and normally subjected to the applied fluid pressure while the other end thereof is subjected to the other supplied fluid pressure, and a centering piston which is normally subjected to the one supplied fluid pressure normally maintains said indicator member in a centered position. The indicator member is movable in response to the applied fluid pressure acting on the one end thereof upon the failure of the other supplied fluid pressure acting on the other end thereof toward a translated or bypassing position to effect open pressure fluid communication through the divider member between the one supplied and applied fluid pressures thereby obviating the proportioning function of the proportion member.

RELATED PATENTS

This patent application is related to U.S. Pat. No. 3,464,741 issued to Edward J. Falk on Sept. 2, 1969, U.S. Pat. No. 3,450,433 issued to Richard C. Bueler on June 17, 1969, and U.S. Pat. No. 3,448,230 issued to Richard C. Bueler on June 3, 1969, said patents being assigned to the common assignee of this patent application which is a patentably distinct improvement. DRAWING DESCRIPTION In the drawings wherein like numerals refer to like parts wherever they occur:

FIG. 1 is a sectional view illustrating a control valve embodying the present invention in cross section;

FIG. 2 is a partial sectional view taken along line 2-2 of FIG. 1;

FIG. 3 is an enlarged fragmentary view taken from FIG. 1; and

FIG. 4 is a graphical representation of the applied or output fluid pressures effected by the proportioning valve of FIG. 1 in response to the input or supplied fluid pressure.

Referring now to the drawings in detail and in particular to FIG. 1, a control valve 1 is provided with a housing 2 which is adapted for direct connection with the housing of a dual or split system master cylinder (not shown); however, if desired, said control valve can be remotely positioned with respect to said master cylinder, as is well known in the art. The housing 2 is provided with stepped bores 3, 4 in axial alignment with stepped counterbores 5, 6 and 7, and shoulders 8, 9, 10 are provided in said housing between the stepped bore 4 and counterbore 5, the counterbores 5 and 6, and the counterbores 6 and 7, respectively. Inlet ports 11, 12, which are adapted for connection with the separate fluid pressure generating chambers of a split system master cylinder, are provided in the housing 2 intersecting with the bore 3 adjacent its rightward end and with the counterbore 6 adjacent to its midportion, respectively, and an outlet port 13, which is adapted for connection with one of the rear and front vehicle brakes (not shown), is also provided in said housing intersecting with the counterbore 7. A closure member end plug 14 is threadedly received in the leftward or open end of the counterbore 7 having a centrally located guide bore 15 therein, and a seal 16 is also positioned in said closure member about said guide bore.

Referring now also to FIG. 2, a cross-bore 17 is also provided in the housing 2 having one end intersecting with the larger stepped bore 4 and the other end thereof connecting with a cross-counterbore 18 which is threaded at its open end to receive an electrical switch 19, to be discussed hereinafter.

Referring now to FIGS. 1 and 3, a sleeve or divider member, indicated generally at 20, is provided with a sleeve or body portion 21 which extends coaxially through the housing counterbore 7, and a peripheral or annular chamber 22 is defined between said housing counterbore and divider body connected in open pressure fluid communication with the outlet port 13 at all times. The divider body 21 is provided with opposed end portions 23, 24 in abutting engagement between the interior end of the closure member 14 and the housing shoulder 10, and peripheral seals 25, 26 are carried in said divider body adjacent to the opposed end portions 23, 24 in sealing engagement with the closure member 14 and the housing counterbore 7. An extension 27 is integrally provided on the divider body end portion 24 extending coaxially through the housing counterbore 6 partially into the counterbore 5 and having a free end or abutment 28 thereon terminating adjacent to the housing shoulder 9. The divider body 21 is provided with a bore 29 interposed between a counterbore 30 which extends coaxially through the extension 27 intersecting with the free end 28 thereof and stepped counterbores 31, 32 and 33 which extend coaxially through said divider portion. A shoulder 34 is provided on the divider body 21 between the bore 29 and counterbore 30, and shoulders 35, 36 are also provided on said divider body between said bore 29 and counterbore 31 and between the counterbores 31 and 32, respectively. A connecting passage 37 is provided in the divider body 21 connecting the counterbore 31 in open pressure fluid communication with the housing annular chamber 22 at all times, and another connecting passage 38 is provided in said body having one end connected in open pressure fluid communication with the body counterbore 33 and the other end thereof intersecting with the divider body rightward or opposed end portion 24 in open pressure fluid communication with the inlet port 12 through the housing counterbore 6 at all times. The connecting passage 38, the body counterbores 31, 32, 33 and the connecting passage 37 of the divider body 21 define a flow passage, indicated generally at F, which is connected with the inlet port 12 through the housing counterbore 6 and with the outlet port 13 through the annular chamber 22, and the bore and counterbore 29, 30 of the divider body 21 define a bypass passage, indicated generally at B, which is connected in parallel, shunting or bypass relation with the flow passage F being connected with said inlet port 12 through the housing counterbores 5, 6.

A metering or proportioning member, indicated generally at 39, is provided with a head portion 40 integrally formed with opposed reduced extensions or stem portions 41, 42. The stem portion 41 extends through the closure member seal 16 in sealing engagement therewith into sliding and guiding engagement with the closure member bore 15, and the extension 42 is slidably and guidably received in the divider body bore 29. A shoulder or abutment 43 is provided on the proportioning piston 39 between the head portion 40 and extension 42, and a proportioning or metering spring 44 is precompressed between said head portion and a retainer 45 to respectively urge said abutment and retainer into engagement with the divider body shoulder 35 and the interior end of the closure member 14, respectively. An annular peripheral groove 46 is provided in the proportioning pistonhead 40 having a base wall 47 interposed between opposed radially extending sidewalls 48, 49, said sidewall 49 defining a valve member for engagement with an annular sealing or seating member 50. Sealing member 50 is provided with an annular portion 51 defining an aperture therethrough and radially spaced from the groove base wall 47 and interposed between opposed sides 52, 53. The seal side 53 is normally seated in abutment with the divider body shoulder 36 and also defines a valve seat for engagement with the valve member or groove sidewall 49. The seal 50 is also provided with an annular peripheral lip 54 in sealing engagement with the divider body counterbore 32, and a plurality of radially extending flow passages or ribs 55 are provided between the seal side 53 and lip 54, said return flow passages being normally closed upon the sealing engagement of said lip with said divider body counterbore. The housing counterbores 5, 6 and the divider body counterbores 32, 33 which are interconnected by the connecting passage 38 define an inlet chamber 56 connected in open pressure fluid communication with the inlet port 12 at all times, and the divider body bore 29 and counterbores 30, 31, and the annular chamber 22 which are interconnected by the connecting passage 37 define an outlet chamber 57 which is connected in open pressure fluid communication with the outlet port 13 at all times. It should also be noted that the sealing engagement of the groove sidewall or valve member 49 with the valve seat 53, as discussed hereinafter, defines an effective area $A_1$ on the proportioning piston 39 which is subjected to the fluid pressure at the outlet port 13, and another effective area $A_2$ is provided by the sealing engagement of the proportioning piston stem 41 with the closure member seal 16 and subjected to the atmosphere in the closure member bore 15 at all times, said area $A_1$ being opposed to and predeterminately greater than the area $A_2$.

A centering member or piston, indicated generally at 58, is slidably received in the housing counterbore 5 having opposed ends or abutment surfaces 59, 60, and an axially extending bore 61 is provided through said centering piston between said opposed ends thereof. A sealing member, such as the O-ring seal 62, is sealably engaged between the housing counterbore 5 and the leftward end 59 of the centering piston 58, and the rightward opposed end thereof is normally engaged with the housing shoulder 8, said O-ring seal and leftward end of said centering piston defining an annular effective area $A_3$ subjected to the fluid pressure at the inlet port 12 at all times.

A reciprocal switch actuating or indicating member, such as the piston indicated generally at 63, is shown in its centered or normal operating position in the housing 2 having opposed extensions, flanges or end portions 64, 65 thereon. The switch piston end portion 64 is slidably received in the housing stepped bore 3, and an annular peripheral seal 66 is carried on said switch piston end portion in sealing engagement with said housing stepped bore. The sealing engagement of the seal 66 with the housing stepped bore 3 defines an effective cross-sectional area $A_4$ on the end portion 64 which is subjected to the fluid pressure at the inlet port 11 at all times, and an inlet chamber 67 is defined in said housing stepped bore between the rightward end wall thereof and said end portion in open pressure fluid communication with said inlet port at all times. The switch piston 63 is slidably received in the centering piston bore 61 and extends through the O-ring seal 62 in sealing engagement therewith, and an annular shoulder or abutment 68 is provided on said switch piston for driving or centering engagement with the rightward end 60 of the centering piston 58. The switch piston end portion 65 is slidably received in the counterbore 30 of the divider body extension 27 having a free end 69 thereon in said extension bore, and an O-ring seal 70 is carried in said switch piston end portion adjacent to said free end thereof normally in sealing engagement with said extension bore. The sealing engagement of the O-ring seal 70 with the extension bore 30 defines another effective cross-sectional area $A_5$ on the switch piston end portion 65 which is subjected to the fluid pressure at the outlet port 13. It should be noted that the sealing engagement of the switch piston seal 70 with the divider body counterbore 30 normally closes the bypass passage B interrupting pressure fluid communication between the inlet chamber 56 and the outlet chamber 57 through said bypass passage. It should also be noted that the area $A_5$ is opposed to and less than the area $A_4$, and that the area $A_3$ is additive to and greater than the area $A_5$; however, the sum of the areas $A_3$, $A_5$ is greater than the area $A_4$.

Referring now to FIGS. 1 and 2, the switch piston 63 is provided with a switch-positioning portion or land 71 which is substantially aligned with the housing cross-bore 17 when said switch piston is in its centered position, as shown, and peripheral cam faces or surfaces 72, 73 are also provided on said switch piston on opposed sides of said land. The switch 18, as previously mentioned, is provided with a conductive closure or plug member 74 threadedly received in the open end of the housing cross-bore 18, and a metal terminal 75 extends through said plug member being insulated therefrom, said terminal having an exterior end for connection in an electrical circuit of a type well known to the art for selectively energizing a driver warning or dash lamp (not shown). A conductive switch member 76 is slidably received in a bore 77 provided in the switch plug 74 and in electrical contact or engagement therewith, said switch member being provided with a follower portion or end 78 extending through the housing cross-bore 17 into following engagement with the land 71 and cams 72, 73 of the switch piston 63. The switch member 76 is also provided with an upper end 79 defining a contact for electrical contact or conductive engagement with the interior end of the terminal 75, and a switch spring 80 urges the contact 79 from said terminal interior end and the follower end 78 toward engagement with the switch piston 63.

In the operation with the component parts of the control valve 1 positioned as shown in the drawings and as described hereinafter, separately supplied or input fluid pressures $P_1$, $P_2$ normally having substantially equal magnitudes are transmitted upon actuation of the split system master cylinder (not shown) to the inlet ports 11, 12, respectively, of the control valve 1. The input fluid pressure $P_1$ flows from the inlet port 11 into the inlet chamber 67 acting on the switch piston area $A_4$ to establish a force $P_1 A_4$, and the input fluid pressure $P_2$ flows from the inlet port 12 into the housing counterbores 5, 6 acting on the centering piston area $A_3$ to establish a force $P_2 A_3$ in opposition to the force $P_1 A_4$ and urging said centering piston toward engagement with the housing shoulder 8 and the switch piston abutment 68. The fluid pressure $P_2$ also flows from the housing counterbore 6 through the divider body connecting passage 38, the counterbores 32, 33, annular groove 46 of the proportioning piston and the divider body counterbore 31 and connecting passage 37 into the annular chamber 22 to establish an applied or output fluid pressure Po at the outlet port 13. The applied or output fluid pressure Po so established in the outlet chamber 57 acts on the effective area $A_5$ of the switch piston 68 to establish a force Po $A_5$ in opposition to the force $P_1 A_4$ and additive to the switch piston force $P_2 A_3$. Since the sum of the areas $A_3$, $A_5$ is greater than the area $A_4$, as mentioned hereinbefore, the additive forces Po $A_5$, $P_2 A_3$ are greater than the opposing force $P_1 A_4$ to normally obviate leftward translatory movement of the switch piston 63 from its centered position. Further, since the force $P_2 A_3$ urges the centering piston 58 into engagement with the housing shoulder 8, it is also apparent that the force $P_1 A_4$ is greater than the force Po $A_5$ to normally oppose rightward translatory movement of the piston 60 from its centered position since the area $A_4$ is greater than the area $A_5$.

The input fluid pressure $P_2$ acts on the input effective area $A_1-A_2$ of the proportioning piston 39 to establish an input force $P_2(A_1-A_2)$, and the output fluid pressure $P_o$ acts on the output effective area $A_1$ of said proportioning piston to establish an output force $Po\ A_1$ opposed to the input force $P_2 (A_1-A)$. Since the input and output fluid pressures $P_2(A_1-A_2)$. Since the input and output fluid pressures $P_2$, Po are initially equal throughout the range OR, as shown on the line ORS in the graph of FIG. 4, and since the output area $A_1$ is greater than the input area $A_1-A_2$ of the proportioning piston 39, it is obvious that the output force $Po\ A_1$ is greater than the input force $P_2 (A_1-A_2)$; however, the compressive force Fc of the metering spring 44 is additive to the input force $P_2 (A_1-A_2)$ and thereby movement of the proportioning piston 39 is prevented until the input and output fluid pressures $P_2$, Po exceed the predetermined value R, as shown on the line OR in the graph of FIG. 4. When the predetermined value R of the input and output fluid pressures $P_2$, Po is attained, the output force $Po\ A_1$ overcomes the additive input and spring forces $P_2 (A_1-A)$, Fc to move the proportioning piston 39 from its normal position in a leftward direction toward an operating or metering position against the compressive force Fc of the metering spring 44. This leftward movement of the proportioning piston 39 initially moves the valve member 49 thereof into lapped engagement with the rightward face or seat 53 of the sealing or valve element 50 to interrupt pressure fluid communication between the inlet and outlet ports 12, 13 through the flow passage F and isolate the input fluid pressure $P_2$ from the output fluid pressure Po.

It is obvious that the increases in the magnitude of the input fluid pressure $P_2$ in excess of the predetermined value R, as illustrated by the line RS in the graph of FIG. 4, will result in proportionally reduced or metered increases in the output fluid pressure Po, as illustrated by the line RT. For instance, when the input fluid pressure $P_1$ is further increased to a value in excess of the predetermined value R, the input force $P_2 (A_1-A)$ is correspondingly increased and additive to the spring force Fc to overcome the output force $Po\ A_1$; therefore, the proportioning piston 39 is moved rightwardly toward a metering position disengaging the proportioning piston valve member 49 from the sealing member seat 53 to effect a metered application of the increased input fluid pressure $P_2$ through the proportioning piston groove 46 into the outlet chamber 57 and therefrom to the outlet port 13 to effect a proportional or ratioed increase in the the output fluid pressure Po, as shown by the line RT in the graph of FIG. 4 wherein $$Po = \frac{P_2(A_1-A_2)+Fc}{A_1}$$

Of course, the increased output fluid pressure Po in excess of the predetermined value R effects a corresponding increase in the output force $Po\ A_1$, and when the increased output force $Po\ A_1$ attains an increased value substantially equal to the additive input force and spring force $P_2 (A_1-A_2)$, Fc, the proportioning piston 39 is again moved leftwardly to reposition the valve member 49 thereof in lapped engagement with the sealing member seat 53 closing the proportioning piston groove 46 to again isolate the input and output fluid pressures $P_2$, Po. It is, of course, obvious that the proportioning piston will be responsive to further increases in the input fluid pressure $P_2$ to effect further proportional increases in the output fluid pressure Po in the same manner as previously described.

When the split system master cylinder is deactuated, the input fluid pressures $P_1$, $P_2$ are vented to atmosphere which eliminates the forces $P_2\ A_3$ and $P_1\ A_4$ acting on the centering and switch pistons 58, 63 as well as the input force $P_2 (A_1-A_2)$ acting on the proportioning piston 39. Upon elimination of the input fluid pressure $P_2$, the output fluid pressure Po acting on the sealing member 50 displaces the lip 54 thereof from sealing engagement with the divider body counterbore 32, and in this manner the applied or output fluid pressure Po returns from the outlet port 13 through the outlet chamber 57, the return flow passages 55 in said sealing member and between the displaced lip thereof and said divider body counterbore into the inlet chamber 56 to the inlet port 11. When the output fluid pressure Po is so reduced to correspondingly reduce the output force $Po\ A_1$ to a value less than that of the metering spring force Fc, the metering spring 44 moves the proportioning piston 39 rightwardly to its original position with the abutment 43 thereof in engagement with the divider member shoulder 35 displacing the proportioning piston valve member 49 from the sealing member seat 53 and thereby opening the proportioning piston groove 46 to again establish open pressure fluid communication between the inlet and outlet ports 12, 13 through the flow passage F and effect complete elimination of the output fluid pressure Po.

In the event of the failure of the input fluid pressure $P_1$ due to a malfunction of the split system master cylinder or other leaks or the like, it is, of course, desirable to obviate the metering function of the proportioning piston 39 and effect the application of the input fluid pressure $P_2$ through the bypass passage B to establish an unaltered or unmetered output fluid pressure Po at the outlet port 13 in order to utilize the maximum available fluid pressure for energizing the vehicle brake set connected with said outlet port under such emergency conditions; therefore, when the magnitude of the applied fluid pressure Po exceeds that of the failed input fluid pressure $P_1$ by a predetermined value, the force $Po\ A_5$ acting on the switch piston 63 will displace said switch piston rightwardly toward its rightward displaced or translated position engaging the switch piston end portion 64 with the end wall of the housing stepped bore 3 since the force $P_1\ A_4$ normally opposing such translatory movement is eliminated upon the failure of the input fluid pressure $P_1$. This rightward translatory movement of the switch piston 63 also moves the leftward end portion 65 thereof toward a displaced or translated position in the divider member counterbore 30 disengaging the switch piston seal 70 therefrom to open the bypass passage B between the inlet and outlet ports 12, 13. In this manner, the input fluid pressure $P_2$ flows from the inlet port 12 through the housing counterbores 5, 6, the divider body bore and counterbores 29, 30 and the connecting passage 37 into the annular chamber 22 and therefrom to the outlet port 13 in bypass relation with the proportioning piston 39 to obviate metering or proportioning actuation thereof, and it is, of course, obvious that the bypassed output fluid pressure Po so established at the outlet port 13 is equal to the input fluid pressure $P_1$ at the inlet port 12 when the bypass passage B is open to effect the application of the maximum available fluid pressure to the vehicle brake set connected with said outlet port under the emergency conditions. Further, the rightward translatory movement of the switch piston 63 also moves the cam surface 72 thereof rightwardly toward a position driving the switch member 76 upwardly against the compressive force of the switch spring 80 to engage the contact 79 with the interior end of the terminal 74 and in this manner complete the electrical circuit for energizing the driver warning or dash lamp (not shown).

The control valve 1 functions in substantially the same manner to complete the electrical circuit for energizing the driver warning or dash lamp in the event of the alternative failure of the supplied fluid pressure $P_2$. Failure of the fluid pressure $P_2$, of course, eliminates the forces $P_2\ A_3$ and $Po\ A_5$ acting on the centering and switch pistons 58, 63 wherein the force of the supplied fluid pressure $P_1$ acting on the switch piston area $A_4$ effects the leftward translatory movement of the switch piston 63 to engage the end 65 of said switch position with the divider body shoulder 34 which defines the leftward translatory position of said switch piston, said centering piston being concertedly movable with said switch piston. During the leftward translatory movement of the switch piston 63, the cam surface 73 thereof drivingly engages the switch member 76 to actuate the switch 19, as previously described.

What I claim is:

1. In a split braking system having a split master cylinder for supplying separate fluid pressures to said split braking system;

a control valve comprising a housing adapted to receive the separate supplied fluid pressures, a divider member in said housing including a pressure fluid flow passage therethrough for one of the supplied fluid pressures, proportioning means movable in said divider member for controlling said flow passage, said proportioning means being movable in response to the one supplied fluid pressure toward a metering position in said flow passage to effect a metered applied fluid pressure through said flow passage in a predetermined ratio with the one supplied fluid pressure, and a bypass passage in said divider member having one end connected with said flow passage and subjected to the applied fluid pressure and the other end thereof subjected to the one supplied fluid pressure, indicator means subjected to the applied fluid pressure and the other of the supplied fluid pressure and movable in said divider member for controlling said bypass passage, said indicator means being movable in response to the applied fluid pressure in said bypass passage acting thereon from a normal centered position toward one of opposed translated positions in said housing to open said bypass passage and establish pressure fluid communication therethrough between the one supplied fluid pressure and the applied fluid in bypass relation with said proportioning member to obviate the metering actuation thereof in the event of the failure of the other supplied fluid pressure acting on said indicator means, and centering means movable in said housing for engagement with said housing and with said indicator means and subjected to the one supplied fluid pressure, said centering means being urged in response to the one supplied fluid pressure acting thereon toward engagement with said housing and said indicator means to oppose movement of said indicator means from its centered position toward the other of its translated positions in response to the other supplied fluid pressure acting thereon.

2. A control valve according to claim 1, comprising first and second opposed end portions on said indicator means movable in said bypass passage and said housing and subjected to the applied fluid pressure and the other supplied fluid pressure, respectively, said first end portion normally interrupting pressure fluid communication through said bypass passage between the one supplied fluid pressure and the applied fluid pressure when said indicator means is in its centered position, said indicator means being movable to its one translated position in response to the applied fluid pressure acting on said first end portion upon the failure of the other supplied fluid pressure acting on said second end portion, and said first end portion being movable to a bypassing position opening said bypass passage to establish the pressure fluid communication therethrough between the one supplied fluid pressure and the applied fluid pressure upon the movement of said indicator means to its one translated position.

3. A control valve according to claim 2, comprising seal means normally engaged between said first end portion and said bypass passage to close said bypass passage and interrupt pressure fluid communication therethrough between the one supplied fluid pressure and the applied fluid pressure, said seal means being disengaged from one of said first end portion and said bypass passage upon the movement of said first end portion to its bypassing position.

4. A control valve according to claim 3, wherein said seal means is carried on said first end portion and disengaged from said bypass passage upon the movement of said first end portion to its bypassing position.

5. A control valve according to claim 1, comprising seal means normally engaged between said indicator means and said bypass passage to close said bypass passage and interrupt pressure fluid communication therethrough between the one supplied fluid pressure and the applied fluid pressure, said seal means being disengaged from one of said indicator means and bypass passage upon the movement of said indicator means to its one translated position to open said bypass passage and establish the pressure fluid communication therethrough between the one supplied fluid pressure and the applied fluid pressure.

6. A control valve according to claim 5, wherein said seal means is carried on said indicator means and disengaged from said bypass passage upon the movement of said indicator means to its one translated position.

7. A control valve according to claim 1, comprising a pair of stepped bores in said divider member defining a portion of said flow passage, said proportioning means being movable in one of said stepped bores, a valve seat on said divider member between said stepped bores for engagement with said proportioning means, said proportioning means being initially movable to its isolating position into engagement with said valve seat to isolate the one supplied fluid pressure in said one stepped bore from the applied fluid pressure in the other of said stepped bores and being thereafter further movable to its metering position disengaged from said valve seat to effect the metered increase in the applied fluid pressure, and said one end of said bypass passage being connected with said other stepped bore.

8. A control valve comprising a housing, a divider member in said housing and defining with said housing a pressure fluid flow passage therethrough for one of separate fluid pressures supplied to said housing, a pair of stepped bores in said divider member defining a portion of said flow passage, an annular shoulder on said divider member between said stepped bores, valve seating means about said flow passage and normally engaged with said shoulder, a proportioning piston movable in one of said stepped bores and having valve means thereon extending into the other of said bores for engagement with said valve seating means to control the application of the one supplied fluid pressure from said one stepped bore to said other stepped bore, resilient means engaged with said proportioning piston and normally urging said valve means toward a position disengaged from said valve seating means, opposed first and second effective areas on said proportioning piston for respective subjection to the one supplied fluid pressure and the applied fluid pressure, said proportioning piston being initially movable against the force of said resilient means in response to the one supplied fluid pressure and applied fluid pressure of a predetermined value respectively acting on said first and second areas toward a position engaging said valve means with said seating means and isolating the one supplied fluid pressure in said one stepped bore from the applied fluid pressure in said other stepped bore, said proportioning piston also being thereafter further movable against the applied fluid pressure acting on said second area in response to increases in the one supplied fluid pressure acting on said first area and assisted by the force of said resilient means toward a metering position disengaging said valve means from said seating means to effect a metered increase in the applied fluid pressure in a predetermined ratio with the increased one supplied fluid pressure in excess of the predetermined value, a bypass passage in said divider member having one end connected with said other stepped bore and the end thereof subjected to the one supplied fluid pressure, indicator means movable between a centered position and opposed translated positions in said housing for indicating a failure of the one supplied fluid pressure and the other of the supplied fluid pressures including a first end portion movable in said housing and having a third effective area thereon subjected to the other supplied fluid pressure, a second end portion on said indicator means and opposed to said first end portion, said second end portion being movable in said divider member for controlling pressure fluid communication through said bypass passage between the one supplied fluid pressure and applied fluid pressure, a fourth effective area on said second end portion opposed to said third area and subjected to the applied fluid pressure, said indicator means being movable from its centered position toward one of its translated positions in response to the applied fluid pressure acting on said fourth area in the event of the failure of the other supplied fluid pressure acting on said third area, and said second end portion being movable toward a bypassing position in said bypass passage establishing open pressure fluid communication therethrough between the one supplied fluid pressure and the applied fluid pressure in bypass relation with said proportioning piston to obviate the metering function thereof when said indicator means is moved to its one translated position, a centering piston movable in said housing for engagement with said housing and said indicator means, and a fifth area on said centering piston opposed to said third are and subjected to the one supplied fluid pressure, said centering piston being urged in response to the one supplied fluid pressure acting on said fifth area toward engagement with said housing and said indicator means to oppose movement of said indicator means from its centered position toward the other of its translated positions in response to the other supplied fluid pressure acting on said third area.

9. In a split braking system having a split master cylinder for supplying separate fluid pressures to said split braking system; a control valve comprising a housing adapted to receive the separate supplied fluid pressures, a divider member in said housing and defining therewith inlet and outlet chambers, said inlet chamber being subjected to one of the supplied fluid pressures, proportioning means movable in said divider member between said inlet and outlet chambers for controlling the application of the one supplied fluid pressure from said inlet chamber to said outlet chamber, said proportioning means being initially movable in response to the one supplied fluid pressure in said inlet chamber and the applied fluid pressure in said outlet chamber of a predetermined value toward a position isolating the one supplied fluid pressure in said inlet chamber from the applied fluid pressure in said outlet chamber and being thereafter further movable in response to increases in the one supplied fluid pressure in said inlet chamber toward a metering position effecting a metered increase in the applied fluid pressure in said outlet chamber in a predetermined ratio with the increased one supplied fluid pressure in excess of the predetermined value, a bypass passage in said divider member having one end connected with said outlet chamber and subjected to the applied fluid pressure and the other end thereof connected with said inlet chamber and subjected to the one supplied fluid pressure, another inlet chamber in said housing subjected to the other of the supplied fluid pressures, indicator means including an end portion movable in said housing and subjected to the other supplied fluid pressure in said other inlet chamber, another end portion opposed to said first-named end portion movable in said divider member for controlling pressure fluid communication through said said bypass passage between the one supplied fluid pressure in said first named inlet chamber and the applied fluid pressure in said outlet chamber, said other end portion being subjected to the applied fluid pressure in said bypass passage, said indicator means being movable from a normal centered position toward one of opposed translated positions in said housing in response to the applied fluid pressure acting on said other end portion in the event of the failure of the other supplied fluid pressure in said other inlet chamber acting on said one end portion, and said other end portion being movable toward a position opening said bypass passage and establishing pressure fluid communication therethrough between the one supplied fluid pressure in said first named inlet chamber and the applied fluid pressure in said outlet chamber in bypass relation with said proportioning means to obviate the metering actuation thereof when said indicator means is moved to its one translated position, and centering means movable in said housing for engagement with said housing and said indicator means and subjected to the one supplied fluid pressure in said first-named inlet chamber, said centering means being urged in response to the one supplied fluid pressure in said first named inlet chamber acting thereon toward engagement with said housing and with said indicator means to oppose movement of said indicator means from its centered position toward the other of its translated positions in response to the other supplied fluid pressure in said other inlet chamber acting on said one end portion.

10. A control valve comprising a housing having a pair of inlet ports and an outlet port, a divider member in said housing including passage means connected between one of said inlet ports and said outlet port, proportioning means movable in said passage means for controlling the application of fluid pressure therethrough from said one inlet port to said outlet port, said proportioning means being initially movable in response to fluid pressures at said one inlet port and said outlet port of a predetermined value toward a position in said passage means isolating the respective fluid pressures at said one inlet port and said outlet port and being thereafter further movable in response to increases in the fluid pressure at said one inlet port toward a metering position effecting a metered increase in the fluid pressure at said outlet port in a predetermined ratio with the increased fluid pressure at said one inlet port, and bypass passage means in said divider member having one end connected with said first named passage means and subjected to the fluid pressure at said outlet port and the other end thereof connected with said one inlet port, indicator means including an end portion movable in said housing and subjected to the fluid pressure at the other of said inlet ports, another end portion opposed to said first named end portion movable in said divider member for controlling pressure fluid communication through said bypass passage means between said one inlet port and said outlet port and subjected to the fluid pressure at said outlet port, said indicator means being movable from a normal centered position toward one of opposed translated positions in said housing in response to the fluid pressure at said outlet port acting on said other end portion in the event of the failure of the fluid pressure at said other inlet port acting on said one end portion, and said other end portion being movable toward a position in said bypass passage establishing open pressure fluid communication therethrough between the fluid pressures at said one inlet port and said outlet port in bypass relation with said proportioning means to obviate the metering actuation thereof when said indicator means is moved to its one translated position, and centering means movable in said housing for engagement with said housing and said indicator means and subjected to the fluid pressure at said one inlet port, said centering means being urged in response to the fluid pressure at said one inlet port acting thereon toward engagement with said housing and with said indicator means to oppose movement of said indicator means from its centered position toward the other of its translated positions in response to the fluid pressure at said other inlet port acting on said one end portion.